(12) United States Patent
Hogue

(10) Patent No.: US 7,485,032 B1
(45) Date of Patent: Feb. 3, 2009

(54) METHOD AND APPARATUS FOR HOISTING AND SKINNING ANIMALS

(76) Inventor: Earl Wayne Hogue, 271 Sawgrass Dr., Shreveport, LA (US) 71106

( * ) Notice: Subject to any disclaimer, the term of this patent is extended or adjusted under 35 U.S.C. 154(b) by 92 days.

(21) Appl. No.: 11/463,602

(22) Filed: Aug. 10, 2006

(51) Int. Cl.
*A22C 15/00* (2006.01)
(52) U.S. Cl. .................................................... 452/187
(58) Field of Classification Search ................... None
See application file for complete search history.

(56) References Cited

U.S. PATENT DOCUMENTS

| | | | |
|---|---|---|---|
| 539,341 A | 5/1895 | Brown | |
| 3,765,630 A | 10/1973 | Woolley | |
| 3,789,458 A | 2/1974 | Brown | |
| 3,854,168 A | 12/1974 | Bradley | |
| 3,871,084 A | 3/1975 | Carrington et al. | |
| 3,894,313 A | 7/1975 | Miller | |
| 4,299,010 A * | 11/1981 | Robertson et al. | 452/128 |
| 4,338,703 A | 7/1982 | Tanner | |
| 4,751,768 A | 6/1988 | Trujillo, Sr. | |
| 4,806,063 A | 2/1989 | York | |
| 4,860,404 A * | 8/1989 | Flachs | 452/187 |
| 4,903,372 A | 2/1990 | Jones | |
| 4,997,152 A * | 3/1991 | Wagman et al. | 248/168 |
| 5,049,110 A | 9/1991 | Owens | |
| 5,211,601 A | 5/1993 | Cope | |
| 5,263,675 A | 11/1993 | Roberts et al. | |
| 5,336,124 A | 8/1994 | Garside | |
| 5,336,129 A | 8/1994 | Frith | |
| 5,482,501 A | 1/1996 | Frits | |
| 5,562,534 A * | 10/1996 | McGough | 452/187 |
| 5,588,907 A | 12/1996 | DePietro et al. | |
| 5,632,671 A * | 5/1997 | Ochylski | 452/128 |
| 5,643,073 A | 7/1997 | Tice | |
| 5,782,684 A | 7/1998 | Shaff | |
| 5,791,858 A | 8/1998 | Sasser | |
| 5,820,455 A | 10/1998 | Breedlove | |
| 6,045,442 A | 4/2000 | Bounds | |
| 6,062,974 A | 5/2000 | Williams | |
| 6,089,431 A | 7/2000 | Heyworth | |
| D431,890 S | 10/2000 | Twilligear et al. | |
| 6,155,771 A | 12/2000 | Montz | |
| 6,202,868 B1 | 3/2001 | Murray | |
| 6,251,005 B1 | 6/2001 | Ekes | |
| 6,296,559 B1 | 10/2001 | Kinnebrew | |
| 6,569,005 B2 | 5/2003 | Maxwell | |
| 6,578,722 B2 | 6/2003 | Perkins et al. | |
| 6,626,748 B2 | 9/2003 | Homer, Sr. | |
| 6,672,953 B2 | 1/2004 | Chappell et al. | |
| 6,695,688 B1 | 2/2004 | Owen et al. | |
| 6,705,821 B2 | 3/2004 | Philipps et al. | |
| 6,739,964 B2 | 5/2004 | Gearhart | |
| 6,988,944 B1 | 1/2006 | Syers | |

(Continued)

*Primary Examiner*—Thomas Price

(57) ABSTRACT

An animal hoisting and skinning apparatus and method that facilitates skinning and processing of large game animals such as deer, as well as smaller furbearing animals, while the animal can be lifted either by the hind legs or the head. The hoisting and skinning apparatus, self-contained and not dependent on a tree or vehicle, has a stationary base with a winch attached at the ground and a crown at the top supported by multiple legs. A winch cable from the winch is passed through a pulley at the crown and back to the ground where an animal is attached and lifted. The disclosed hide grabbing devices are attached to loosened hide, secured to the base, and the carcass is pulled from the hide.

16 Claims, 6 Drawing Sheets

U.S. PATENT DOCUMENTS

| | | |
|---|---|---|
| 6,994,618 B1 | 2/2006 | Syers |
| 7,059,955 B2 | 6/2006 | Green et al. |
| 7,059,956 B1 | 6/2006 | Summerlin |

* cited by examiner

METHOD AND APPARATUS FOR HOISTING AND SKINNING ANIMALS

BACKGROUND OF THE INVENTION

1. Field of Invention

The present invention relates generally to the process of skinning and processing of harvested game animals.

In particular, the present invention relates to a new method and self-contained apparatus for hoisting, either from the hind legs or head, and skinning animals, both large and small, along with a device for grabbing and securing the hide of the animal for pulling.

2. Prior Art

Game hoisting and/or skinning devices described in the prior art generally fall into seven categories: commercial skinning machines; hide grabbing devices; ATV mounted hoists; vehicle hitch mounted hoists; tree/pole mounted hoists; free standing hoists; and mechanical skinning aids. Some of the devices have attributes that cross over to other categories, but none contain or offer the attributes or capabilities of the present invention.

Commercial meat processing industry skinning devices (e.g. U.S. Pat. No. 4,751,768 issued to Trujillo or U.S. Pat. No. 3,789,458 issued to Brown) are impractical for use by hunters and trappers on game animals and are not comparable to the process for which the present invention is designed.

Hide grabbing devices such as U.S. Pat. No. 6,569,005 (Maxwell) offer only a way to grab the hide for mechanical skinning but do not cover hoisting the carcass into the air for final processing. These devises also do not address the question of sanitation and further butchering of the carcass.

Similarly, most ATV and vehicle hitch mounted devices are designed simply to lift game off the ground for hauling and therefore are also not comparable. U.S. Pat. Nos. 6,155,771 issued to Montz and 6,705,821 issued to Phillips are illustrative examples of the categories respectively.

Additionally, most of the tree/pole mounted hoists and the free standing devices are designed simply for lifting game off the ground to enable manual or hand skinning and processing. U.S. Pat. No. 6,045,442 issued to Bounds and U.S. Pat. No. 7,059,956 issued to Summerlin are general examples illustrating the categories respectively.

The seventh category is the one in which the present invention falls: mechanical skinning aids.

U.S. Pat. No. 6,251,005 (Ekes) discloses an animal skinning rack. The device is used simply for holding the carcass in position for skinning but does not offer hoisting into the air in order to finish processing the carcass.

U.S. Pat. No. 5,336,124 issued to Garside discloses a device to secure a deer to a tree and a hide grabbing device that requires use of a vehicle to pull the skin from the animal. The device also does not offer hoisting into the air for further processing and the carcass is subject to contamination because it must be in contact with the ground before and after the skinning process.

U.S. Pat. No. 5,782,684 (Shaff) discloses a portable animal skinner where the animal is secured laying horizontally on a table of sorts and the hide is pulled off using a winch. Again, the device does not offer hoisting capabilities necessary to complete the processing and butchering of the carcass.

All of the aforementioned devices, being horizontal skinning apparatuses, introduce the de-skinned carcass to contamination by dirt, debris, hair, or other contaminants from the ground, the surface with which it is in contact with, or the outside of the animal's hide.

U.S. Pat. No. 6,672,953 (Chappell) discloses a game skinner which is a vehicle hitch mounted winch system used simply for pulling the hide from an animal after it is hoisted into the air by nonspecified means. The device does not offer hoisting capabilities necessary to complete the butchering process.

U.S. Pat. No. 5,562,534 (McGough) discloses a tree mounted hoist and skinning aid that entails a two-step process whereby the animal must be picked up first then transferred from the winch hook to a stationary chained position overhead, then the winch hook and cable re-routed through a lower pulley where it is attached to the skin and the winch is used to mechanically pull the hide from the animal. The device has limited distance between the stationary hook-up and the lower pulley which limits the ability to pull the skin from the entire animal. A user would have to move the hold on the hide several times during the skinning process because of the limited pulling distance.

U.S. Pat. No. 539,341 (Brown) discloses a collapsible tripod type skinning rack designed for skinning cattle but as before, the animal must first be hoisted into the air and transferred to a stationary mounting. Additionally, with this device the animal's head at the lower end must be secured because the hide is pulled upward and as before, there is little room above for the pulling area necessary to remove a hide from an animal.

U.S. Pat. No. 6,296,559 (Kinnebrew) discloses a dismantlable skinning apparatus utilizing an electric winch. The device does not appear that it could be of sufficient strength to withstand the amount of force necessary to remove the hide from an animal. Additionally, the animal must be laying on the ground when the skinning operation begins, possibly subjecting the meat to contaminants. Use of an electric winch is also a potential safety hazard because winches are made to pull weight but not hold it.

U.S. Pat. No. 6,626,748 (Horner, Sr.) discloses an ATV mounted multi-purpose device with one of the purposes being hoisting and skinning game. The same hazard as with the previous device is present in this device because it uses the ATV winch as the lifting mechanism. Winches are made to pull but not hold weight, so there is a distinct possibility that the animal will begin to lower as soon as the winch button is released. The animal must also first be lifted, then transferred to a stationary hook so the winch cable can be rerouted for pulling the hide. There is limited room for pulling the hide and the device does not appear of sufficient strength to withstand the force necessary for pulling a hide from an animal.

U.S. Pat. No. 5,211,601 (Cope) discloses a mechanical skinning device whereby the animal must be laying on the ground in order for the hide to be mechanically grabbed, then the animal is lifted or pulled out of the skin. As before, there appears to be limited distance between the upper pulley and the hide gripping point so the animal would have to be raised and lowered several times so the hold on the hide could be reset higher on the hide. Additionally, the Cope device is designed specifically for large game such as deer and would not work for smaller animals such as furbearing animals. The device is designed such that the deer must be hoisted by the rear legs and would not allow hoisting by the head, which many hunters prefer. Also, because the device calls for a single upright support, it would require constructing it of extremely heavy metal in order for it withstand the amount of tension necessary to remove the hide from a large game animal thereby making it impractical for easy or light transporting.

U.S. Pat. No. 6,994,618 (Syers) discloses a game hoisting and skinning device, but the animal must be picked up and transferred, in the raised position, to a stationary hanging point so the winch can be released, rotated, rerouted, then used to pull the hide. Also, the distance between the upper stationary support and the lower pulley is severely limited making it necessary to re-grab the hide many times while skinning an animal. If the device were built tall enough to eliminate this problem, a ladder or other elevation assistance would be necessary to reach the stationary hanging chaining mechanism. As soon as the skinning process was finished, the animal would have to be once again transferred back to the winch hook in order to be lowered so the processing procedure could be finished.

An additional missing capability from all distinguished prior art is the ability to raise the carcass out of the reach of dogs or other animals to let it cool and/or age as is common in colder climates.

Another missing capability illuminated in the prior art is a device that will work equally well whether the animal is hung from the hind legs or by the head. Hunters differ on the preference, most prefer hanging the animal by the hind legs and skinning from the hind legs down to the head; however, many prefer to hang the animal by the head and skin from the neck down to the hind legs.

As seen by the analysis of the prior art, there is a need for a device that incorporates the missing capabilities and eliminates the various shortcomings in the prior art disclosures.

Accordingly, several objects and advantages of the present invention are:

providing a new method and apparatus for skinning and processing animals.

a self-contained apparatus not dependent on a utilizable tree or pole nor requiring a vehicle to complete the skinning and butchering procedure.

a mechanical skinning apparatus that performs the skinning process off the ground, away from dirt, debris, and other contaminants.

an apparatus constructed of sufficient strength to withstand the substantial force necessary to mechanically remove the hide from an animal.

a method and apparatus that allows completion of the skinning process without requiring the transfer of the animal from the movable winch cable to a stationary point and back again.

an apparatus that will successfully aid and complete the skinning process while lifting the animal either from the rear legs or from the head.

an apparatus with sufficient height to complete the skinning process without the need to continuously reset the hide grab points.

an apparatus that will keep the meat of the carcass clean and free of contaminants from contact with the ground, outside of the hide, or from human hands.

a self-contained entire skinning system that is portable, dismantlable, and compact when disassembled for storage or transport.

a skinning system that will allow a single person, with no help, to completely perform the skinning and butchering process.

an apparatus with the ability to raise the carcass out of the reach of dogs or other animals to cool or age after the process.

a skinning and hoisting apparatus that will work equally well on large game such as deer and small furbearing animals such as raccoons or beavers.

Further objects and advantages of the present invention will become apparent from a consideration of the drawings and ensuing description.

SUMMARY OF THE INVENTION

The present invention provides a new method for skinning animals and a hoisting and skinning aiding apparatus that incorporates the missing capabilities and eliminates the shortcomings of all currently available mechanisms.

The present invention provides an animal hoisting/skinning apparatus that is composed of a three-legged upright tripod style structure. The tops of the three legs are brought into close proximity to each other and connected to the top crown. At the ground, the bottoms of the legs are connected to the base feet. The feet are spread apart and held in position by rigid connectors. A winch is mounted to one of the feet with the cable traveling upwards to the crown, through a pulley, and back down to ground level.

In hoisting, if the animal is to be hung by the hind legs, a gambrel is attached to the rear legs and the winch hook is connected to the gambrel whereby the animal is lifted using the winch. If the animal is to be skinned from the head down, a noose, or choker, is wrapped around the animal's head, the winch hook connected to the noose and the animal is lifted with the winch.

When skinning an animal, depending on how the animal is lifted, the animal's hide on each of the hind legs or on the neck is first split and separated from the carcass to create a loosened flap of skin. The ball-noose-chain hide grabbing devices disclosed by the present invention are engaged to the loosened flaps of hide and the prescribed chains are hooked into the hooks on the feet of the skinning apparatus. With the animal's hide secured to the base of the skinning apparatus, the winch is used to raise the animal and pull it from its skin.

After the skin is removed, the carcass is lowered where the processing and butchering procedure is completed.

| List Of Reference Numbers | |
|---|---|
| 10 | Hoisting/Skinning Apparatus |
| 12 | Left Front Base Foot |
| 14 | Chain Hook |
| 16 | Right Front Base Foot |
| 18 | Chain Hook |
| 20 | Rear Base Foot |
| 22 | Ball-Noose-Chain Hide Grabber |
| 22a | Ball |
| 22b | Flexible Wire Rope |
| 22c | Flexible Wire Rope |
| 22d | Solid Link Steel Chain |
| 24 | Ball-Noose-Chain Hide Grabber |
| 24a | Ball |
| 24b | Ball Wire Rope |
| 24c | Noose Wire Rope |
| 24d | Solid Link Steel Chain |
| 30 | Front Feet Ground Connector Bar |

-continued

List Of Reference Numbers

| | |
|---|---|
| 32 | Rear Foot Ground Connector Bar |
| 40 | Left Front Leg |
| 40b | Left Front Leg Bottom Section |
| 40m | Left Front Leg Middle Section |
| 40t | Left Front Leg Top Section |
| 50 | Right Front Leg |
| 50b | Right Front Leg Bottom Section |
| 50m | Right Front Leg Middle Section |
| 50t | Right Front Leg Top Section |
| 60 | Rear Leg |
| 60b | Rear Leg Bottom Section |
| 60m | Rear Leg Middle Section |
| 60t | Rear Leg Top Section |
| 70 | Winch Upright Mount |
| 72 | Winch |
| 74 | Winch Cable |
| 76 | Winch Cable Hook |
| 78 | Gambrel |
| 80 | Choker Noose |
| 90 | Top Crown |
| 92 | Eye-bolt |
| 94 | Pulley |

DETAILED DESCRIPTION OF THE INVENTION

Figure 1:
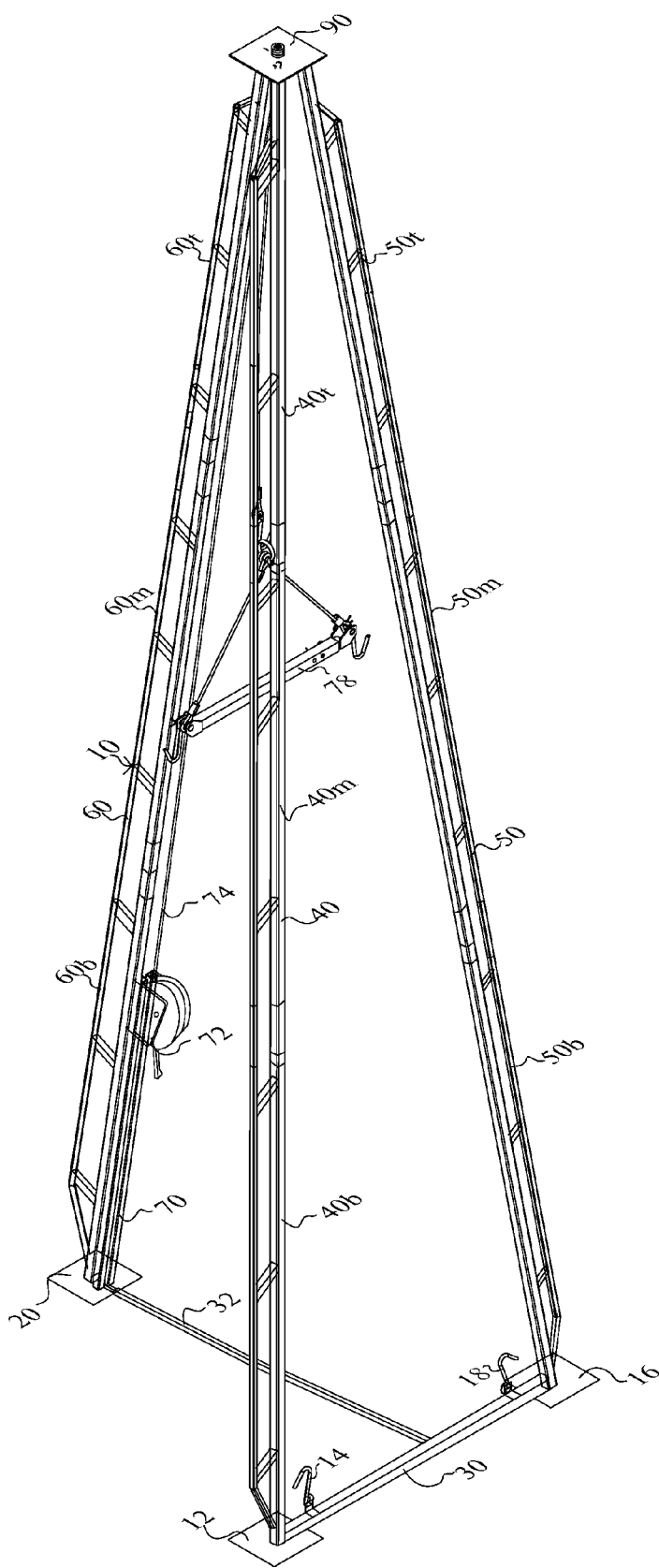
FIG. 1 is an isometric perspective view of the Hoisting/Skinning Apparatus of the present invention.
Figure 2:
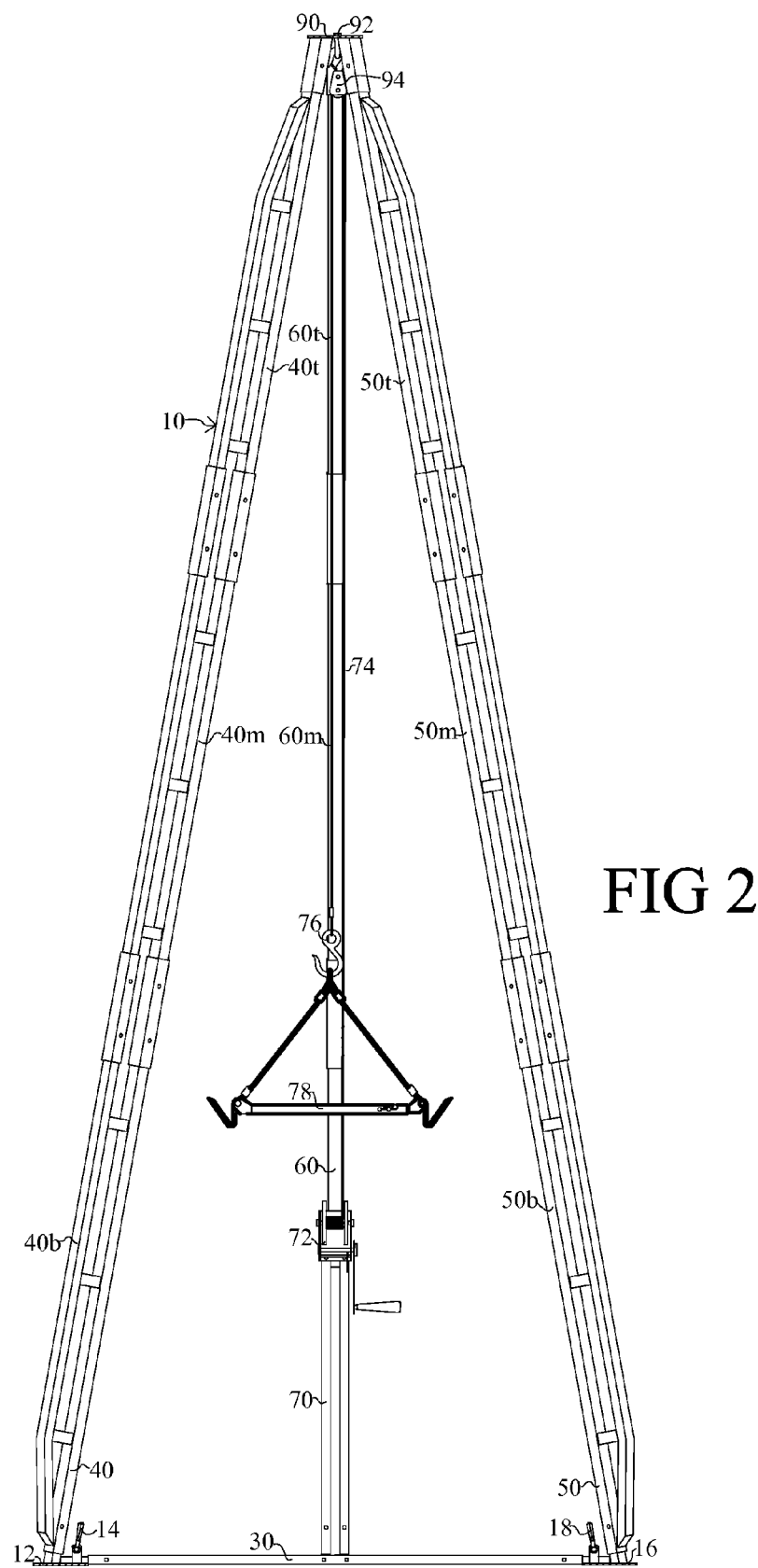
FIG. 2 is an elevational front view of the device with a gambrel ready for an animal.
Figure 3:
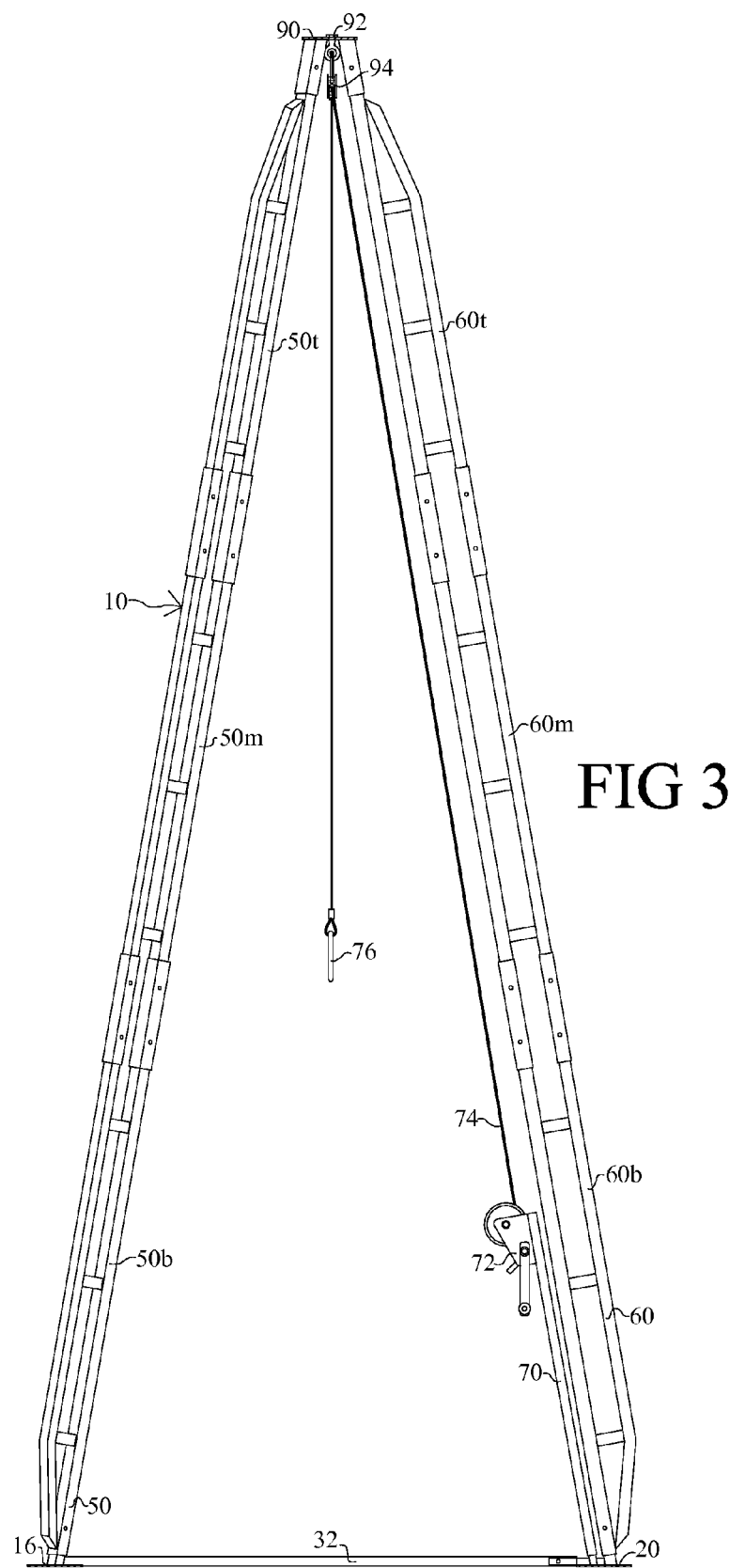
FIG. 3 is an elevational side view of the device without a gambrel.

FIG. 1 is a perspective view of one embodiment of the animal hoisting and skinning apparatus of the current invention. FIG. 2 is an elevational front view and FIG. 3 is an elevational right side view of one embodiment of the current invention. The skinning apparatus 10 depicted in FIG. 1, FIG. 2, and FIG. 3 generally comprises a standing upright tripod type structure with three substantially vertical legs 40, 50, and 60, sloping inwardly with increasing elevation towards a common center point, each with a base foot 12, 16, and 20 at the ground held rigidly apart and in place by connectors 30 and 32 and a single common top crown 90 where the three legs are adjoined together in close proximity. Winch upright mount 70 and winch mechanism 72 are connected to the rear base foot 20 with winch cable 74 traveling up to crown 90, through pulley 94 mounted to the crown by eye-bolt 92 and back down to ground level where gambrel 78 or choker noose 80 is attached to the winch cable hook 76 for use in attaching the animal to be hoisted.

Forming the T-shaped rigid base of the tripod structure, front feet ground connector bar 30 lays horizontally along the ground with one end coupled to left front foot base 12 and the other to right front foot base 16. Rear foot ground connector bar 32 also lays horizontally along the ground perpendicular to connector 30 with one end coupled to connector 30 about midway the length of connector 30 and the other end coupled to rear base foot 20 completing the substantially three footed T-shaped rigid base of the tripod type structure.

Chain hooks 14 and 18 are attached to feet 12 and 16 generally along the path of connector 30 and in close proximity to legs 40 and 50 as part of the skinning capabilities of the apparatus. Use of the hooks is discussed in the Operation of Invention section.

Winch upright mount 70 is coupled to rear foot 20 also generally along the path of connector 32 and in close proximity to and following the upward angle of rear leg 60. Winch 72 is mounted to the top of mount 70 in order to raise winch 72 to a convenient workable height. Winch cable 74 is passed from winch 72 upward to crown 90, through pulley 94 that is mounted to crown 90 with eye-bolt 92, then back down to end at winch cable hook 76 near ground level where gambrel 78 is attached for back legs up hoisting (FIG. 5) or where choker noose 80 is attached for head up hoisting (FIG. 6).

In order for the tripod apparatus to withstand up to 2000 pounds, the amount of tension generated by the winch necessary to remove the hide from a large game animal, legs 40, 50, and 60 are constructed primarily of a gantry style construct in the preferred embodiment. This construct entails parallel main beams spaced a distance apart connected intermittently with spacer pieces. Additionally, to make the apparatus more compact when not in use and dissembled, legs 40, 50, and 60 in the preferred embodiment are composed of three sections (40b, 40m, 40t, 50b, 50m, 50t, 60b, 60m, and 60t respectively), each slibably connected end-to-end to form the entire length of each leg.

With the base constructed, feet 12, 16, and 20 connected rigidly by connectors 30 and 32, leg 40 is coupled to foot 12 on the bottom and crown 90 at the top, leg 50 is coupled to foot 16 on the bottom and crown 90 at the top, leg 60 is coupled to foot 20 on the bottom and crown 90 at the top to form the entire tripod type main structure.

Figure 4:
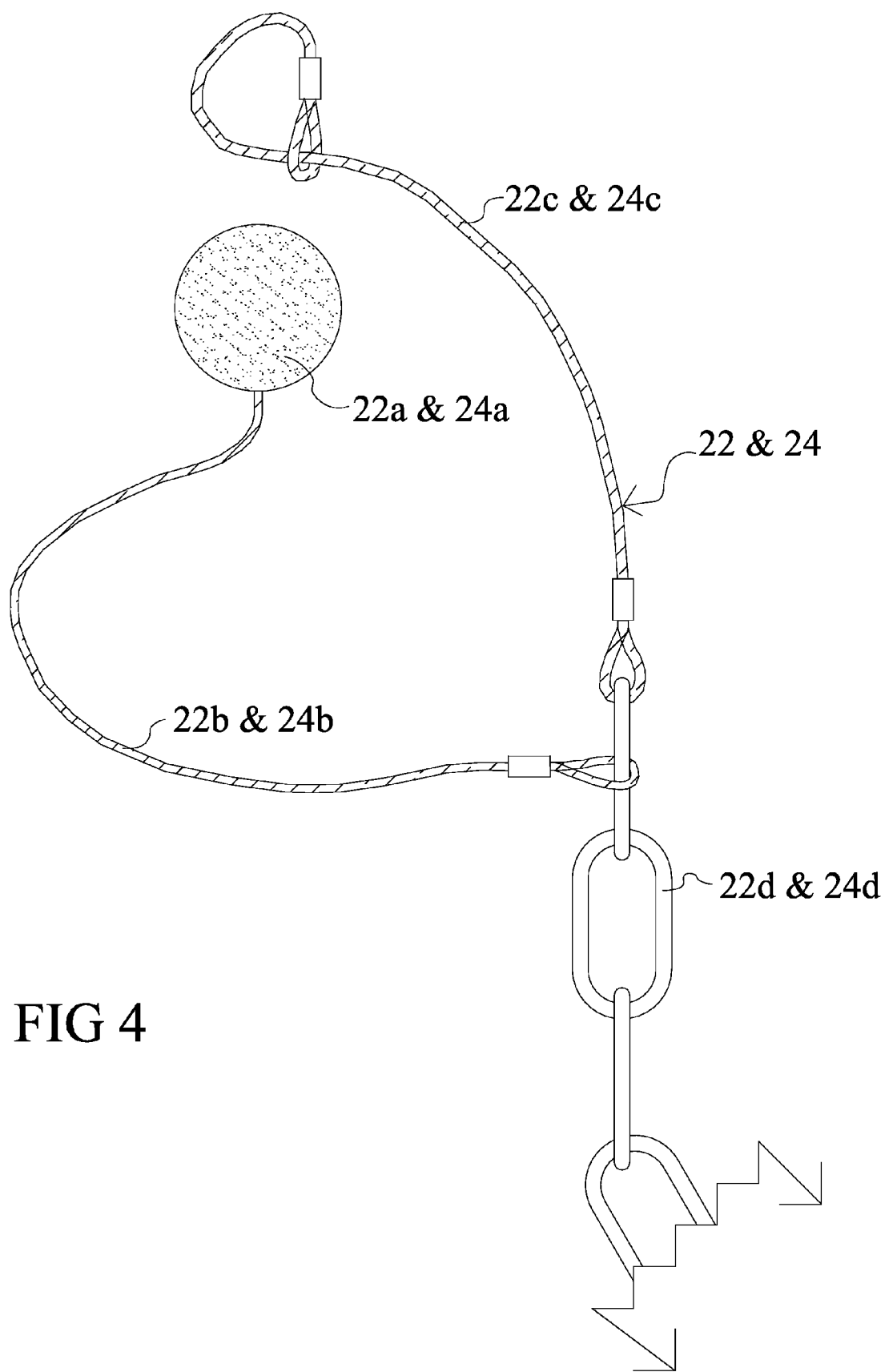
FIG. 4 is a detail view of the Ball-Noose-Chain Hide Grabbing Device.

FIG. 4 is a detail view of the preferred embodiment of the ball-noose-chain hide grabbing devices 22 and 24 of the current invention. While devices 22 and 24 are identical, they are described herein separately in order to clearly disclose the invention and the operation. The device is constructed of balls 22a & 24a of a certain diameter tethered to one end of ball wire ropes 22b & 24b with the other end securely looped and fixed to the end link of solid link steel chains 22d & 24d. Noose wire ropes 22c & 24c have one end securely looped and fixed to the end link of the steel chains 22d & 24d while the other end has a slip noose fixed for slipping over balls 22a & 24a after loosened hide is pulled over the ball. Use of hide grabbing devices 22 and 24 is discussed in the Operation of Invention section.

Figure 5:
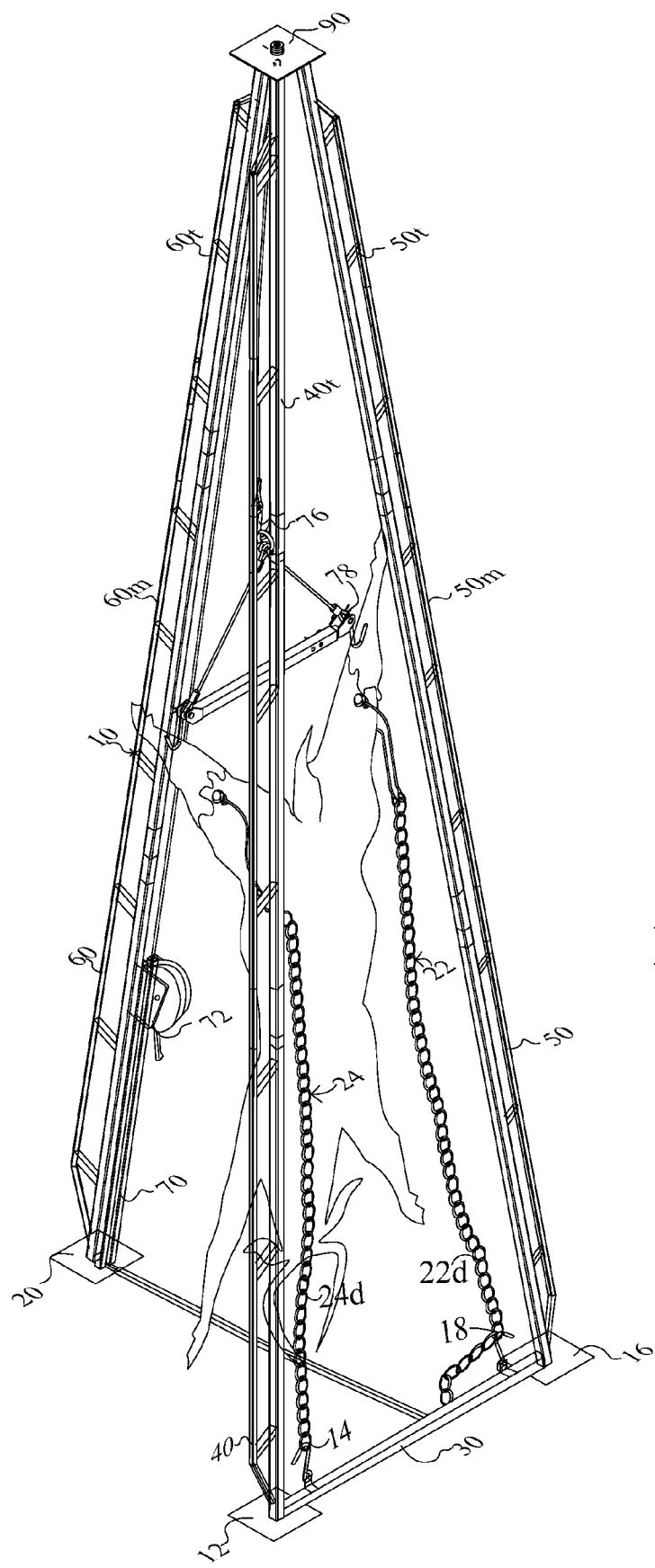
FIG. 5 is an isometric perspective view of the device showing the method of use for an animal hoisted by the hind legs.
Figure 6:
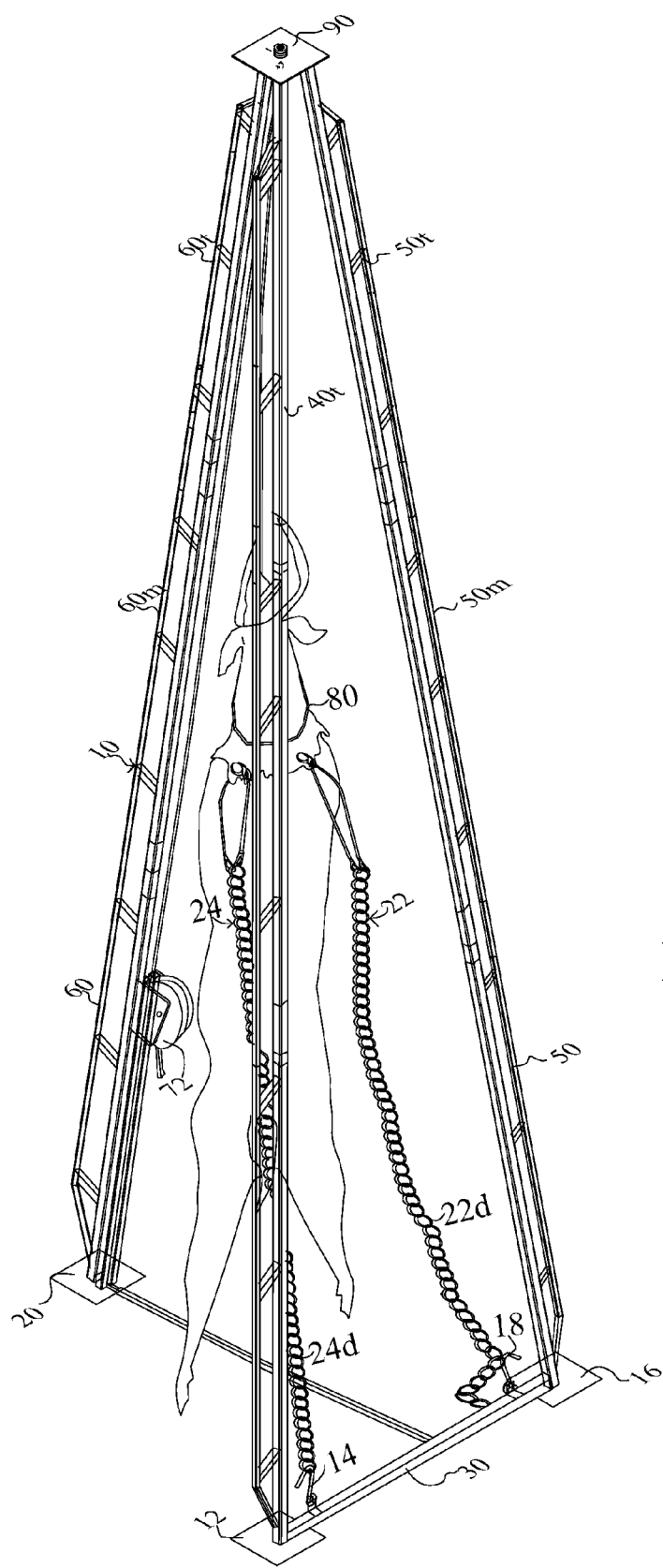
FIG. 6 is an isometric perspective view of the device showing the method of use for an animal hoisted by the head.

FIG. 5 is a perspective view of the current invention illustrating the method of use in the hind legs up position. Gambrel 78 has been attached to the hind legs of a harvested game animal and the animal has been hoisted into the air by use of winch 72. Hide grabbing devices 22 and 24 have been engaged to the loosened hide on the hind legs, chains 22d and 24d are hooked into hooks 14 and 18, and the skinning process is ready to begin by hoisting the animal further into the air.

FIG. 6 is a perspective view of the current invention illustrating the method of use in the head up position. Choker noose 80 has been fitted around the neck of a harvested game animal, hooked into hook 76 and the animal has been hoisted into the air by use of winch 72. Hide grabbing devices 22 and 24 have been engaged to the loosened hide on the neck, chains 22d and 24d are hooked into hooks 14 and 18, and the skinning process is ready to begin by hoisting the animal further into the air.

OPERATION OF THE INVENTION

FIG. 5 illustrates the method of use when hanging an animal by the rear legs. Gambrel 78 is attached to the rear legs of a harvested game animal, hook 76 is hooked to the gambrel and the winch is used to raise the animal into the air. The hide is then split and loosened on the rear legs enough to produce flaps of hide where (FIG. 4) balls 22b and 24b are placed under the flap on the hair side of the hide and the hide is pulled snug over the ball. The hide covered balls 22b and 24b are passed through the opened noose on wire ropes 22c and 24c, the noose is then cinched tight below the ball around the hide. Chains 22d and 24d are then hooked into hooks 14 and 18. The hide is peeled off when the animal is hoisted further into the air with the winch. When the hide has been completely stripped down to the head, the animal is then lowered to ground level where the eviscerating and butchering procedure can be completed. If desired, when the procedure is complete, the dressed carcass may be lifted into the air once more out of the reach of dogs or other animals to be cooled or aged.

FIG. 6 illustrates the method use when hanging an animal by the head. Choker noose 80 is cinched around the neck just behind the head of a harvested game animal then hooked into hook 76 and the animal is hoisted into the air with winch 72. The hide is then split and loosened on the neck to produce flaps of hide where (FIG. 4) balls 22b and 24b are placed under the flap on the hair side of the hide and the hide is pulled snug over the ball. The hide covered balls 22b and 24b are passed through the opened noose on wire ropes 22c and 24c, the noose is then cinched tight below the ball around the hide. Chains 22d and 24d are then hooked into hooks 14 and 18. The hide is peeled off when the animal is hoisted further into the air with the winch. When the hide has been completely stripped, the animal is then lowered to ground level where the eviscerating and butchering procedure can be completed. If desired, when the procedure is complete, the dressed carcass may be lifted into the air once more out of the reach of dogs or other animals to be cooled or aged.

ALTERNATIVE EMBODIMENTS

It is understood that the foregoing description is the currently preferred embodiment of the current invention and that numerous alternative embodiments and various modifications are possible without departing from the spirit of the invention.

One example of an alternative embodiment is that the structure and method could be horizontal to the ground and the skinning process performed horizontally instead of the preferred vertical direction described in the foregoing description. The method of skinning revealed with the current invention, although preferred vertical, could be performed in any direction.

Additional alternatives include: The upright tripod structure could have additional legs added becoming a four or more legged structure. The legs could be constructed in any of numerous configurations, materials, or profiles such as pipe, I-beam, or some other structural material or configuration. The legs could also be one-piece rather than three-piece as in the current embodiment. The mechanical winch could be changed to an electrical hoist. The overall structure could be taller or shorter, wider or narrower at the bottom or top, or any number of possible alternative configurations. There are also a number of optional additions that could be added to the apparatus such as lights, knife trays, weighing scales, and others.

The construct of the ball-noose-chain hide grabbers could be configured numerous different ways. Variations could include: ball size and material, wire rope size, material, length and construct, and chain use, material, configuration, and construct. The hide grabbers could be used by themselves in the skinning method that entails using a vehicle to pull the hide from an animal. Additionally, the preferred embodiment utilizes two hide grabbers but the skinning method revealed could be carried out with only one hide grabber or more than two.

It is clear that the disclosed invention provides a new method for skinning and processing animals and a self-contained, portable, dismantleable, mechanical skinning aiding apparatus that can withstand the force necessary to remove the hide; keeps the carcass away from the ground and contamination; works equally well whether hanging the animal from the hind legs or the head; works on both large and smaller animals; easily allows a single person to perform the skinning and butchering task; and eliminates the need to transfer the animal from the winch hook and back again.

What is claimed is:

1. An animal hoisting and skinning apparatus generally comprising a derrick type structure comprising:
   at least three planar base feet configured to rest upon a substantially horizontal surface including;
      a. each foot having clamping connecting means for attaching a leg;
      b. each foot having means for connecting rigid spreader connector members;
      c. at least one foot having chain hooking means;
      d. one foot having means for attaching a winch mount member;
   said rigid elongated spreader connector members forming a substantially T-shaped formation configured to rest upon said substantially horizontal surface with each end point of said T-shaped formation connected to one of each of said feet whereby feet are rigidly held in positional configuration;
   a planar crown platform including clamping connecting means for attaching legs and hanger means for attaching a pulley with a pulley attached to said hanger means;
   at least three elongated leg members of predetermined length each having a first end connected to one of said feet and a second end connected to said crown platform;
   said elongated winch mount member having a first end connected to said foot with means for connecting a winch mount member and a second end configured to accept a winch;
   a winch or pulling means connected to said winch mount;
   a cable from said winch passing through said pulley on said crown to means for attaching an animal for hoisting and skinning;
   at least one hide grabbing device comprising a ball tethered to the first end of a length of chain with a first end and a second end and a cable or other tethering material forming a slip noose on a first end and tethered to said first end of said chain on a second end whereby hide from animal is placed over ball and slip noose is placed over the hide covered ball and cinched down grabbing the hide and second end of said chain is secured to said hooking means on said foot whereby animal is in the ready configuration for skinning.

2. The hoisting and skinning apparatus of claim 1 wherein said derrick type structure is generally a vertically configured multi-legged structure with a bottom generally at ground level and a top generally vertical of said bottom separated a distance determined by the length of said leg members having said legs separated some distance at ground level but coming in closer proximity at a smaller measured common single point at the vertical top.

3. The hoisting and skinning apparatus of claim 1 wherein said elongated leg members are comprised of a plurality of sections whereby said leg members may be disassembled.

4. The hoisting and skinning apparatus of claim 1 wherein said elongated leg members are constructed in a gantry-style construct including a double main beam design connected intermittently by braces whereby member gains increased bending and tensile strength to weight ratio.

5. The hoisting and skinning apparatus of claim 1 wherein said clamping connecting means for attaching said legs to said feet and said crown platform include an elongated member with an inside profile juxtaposed to the outside profile of an end section of said leg members split longitudinally into a first piece and a second piece wherein first piece is nonrotatably attached one to each foot and a plurality to said crown platform at angles sufficient to meet the angles required to connect leg members between said feet and crown platform whereby end of leg is placed into the nonrotatably attached first piece of said clamping connecting member and said second piece is fitted on the opposite side of said end of leg member and fasteners are inserted through aligned bores in both pieces of the clamping connecting member and leg member to securely and nonrotatably fasten leg members to said feet and crown.

6. The hoisting and skinning apparatus of claim 1 wherein said chain hooking means are chain hooks generally sized to significantly match size of chain used for said length of chain on said hide grabbing device.

7. The hoisting and skinning apparatus of claim 1 wherein said elongated winch mount member is of a configured length wherein said attached winch is positioned at a comfortable working height.

8. The hoisting and skinning apparatus of claim 1 wherein said winch is an electrical or mechanically operated winching and hoisting device.

9. The hoisting and skinning apparatus of claim 1 wherein said hanger means for attaching a pulley is a fastener and pulley of a weight rated strength at least similar to pulling strength of said winch.

10. A portable game hoisting and skinning apparatus comprising:
- a planar crown platform including nonrotatable fastening means for attaching leg members and means for attaching a cable pulley with a cable pulley attached to said means;
- at least three elongated leg members having a first end and a second end said first end attached to said crown platform by said fastening means;
- at least three planar feet platforms configured to rest upon a substantially horizontal surface including nonrotatable fastening means for attaching said second end of said leg members including;
  - a. at least one of said feet including chain hooking means;
  - b. at least one of said feet including means for connecting an elongated hoisting device mount member;
- said elongated hoisting device mount member having a first end connected to said foot including hoisting device mount member connecting means and a second end configured to accept hoisting device;
- said hoisting device attached to said second end of said hoisting device mount member;
- a cable passing from said hoisting device over said pulley on said crown to means for hoistingly attaching an animal whereby animal is elevated in operation of hoisting device;
- at least one hide grabbing and securing device including;
  - a. a length of chain having a first end and a second end;
  - b. a generally spherical object tethered to said first end of said chain;
  - c. a cable or tethering material having a slip noose on a first end and a second end fastened to said first end of said length of chain whereby hide is placed over said spherical object and said slip noose is placed over the hide covered spherical object and cinched snug providing means for grabbing hide;
- said second end of said chain is attached to said hooking means on said foot whereby hide is secured to said foot.

11. The apparatus of claim 10 wherein said fastening means for attaching leg members to said crown platform and feet platforms comprise an elongated member with an inside profile juxtaposed to approximately half the outside profile of an end portion of said leg members nonrotatably attached one to each foot platform and at least three attached to said crown platform wherein end portion of said leg member is situated into attached member and another elongated member with an inside profile juxtaposed to approximately half the outside profile of said end portion of said leg is placed on opposite side of said situated end of leg member thereby clamping said leg member and tightening fasteners are inserted through aligned bores in all three members and tightened whereby leg members are nonrotatably attached to said crown platform and feet platforms.

12. The apparatus of claim 10 wherein said hoisting device is a hand operated or electrical winch or hoist.

13. The apparatus of claim 10 wherein said means for hoistingly attaching an animal is a gambrel or chocker or similar mechanism.

14. A method of removing the hide from an animal comprising:
- providing a derrick type apparatus including a crown or top directly opposing a base or bottom a predetermined distance including means for hoisting an animal towards said crown away from said base and providing ball-noose-chain devices configured for grabbing and holding the hide of an animal previously hoisted to a comfortable elevated working height and securing the grabbed hide to the base of the apparatus;
- affixing a gambrel or other supporting means to hind legs of animal;
- attaching cable from said provided hoisting means to said gambrel or supporting means;
- hoisting animal in a hind legs up position to a comfortable workable elevated height;
- splitting the hide around each hind leg and across the hind legs and down the centerline of the abdomen and brisket and neck and around front legs and along front legs connecting with split on brisket;
- loosening portions of hide on the hind legs to provide enough loosened hide to attach hide grabbing devices;
- attaching hide grabbing devices to said loosened flaps of hide;
- securing hide grabbing devices to base of provided apparatus;
- hoisting animal whereby the carcass is forcibly pulled away from the secured to base hide until hide and carcass are completely separated.

15. A method as in claim 14 wherein the step of splitting the hide around and across the hind legs and down the centerline of the abdomen and brisket and neck and around front legs and along front legs connecting with split on brisket is performed at any prior point in the method steps.

16. A method as in claim 14 wherein a choker or cable is cinched around the neck of the animal just behind the head and animal is hoisted off the ground in the head up position rather than a hind legs up position to a workable elevated height;
- splitting the hide completely around the neck and down the centerline of the sternum and abdomen;
- loosening flaps of hide on the neck providing enough loosened hide to enable provided hide grabbing devices;
- attaching hide grabbing devices to said loosened flaps of hide;
- securing hide grabbing devices to base of said hoisting and skinning apparatus;
- hoisting animal whereby the carcass is pulled away from the secured hide until hide and carcass are completely separated.

* * * * *